United States Patent
Li et al.

(10) Patent No.: US 8,446,847 B2
(45) Date of Patent: May 21, 2013

(54) SYSTEM, DEVICE AND METHOD FOR IMPLEMENTING SPECIAL CALL SERVICE

(75) Inventors: Jiu Li, Shenzhen (CN); Gaoqi Chen, Shenzhen (CN); Zhangping Ma, Shenzhen (CN); Zhou Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1037 days.

(21) Appl. No.: 12/417,345

(22) Filed: Apr. 2, 2009

(65) Prior Publication Data

US 2009/0190507 A1    Jul. 30, 2009

Related U.S. Application Data

(63) Continuation of application No. PCT/CN2008/070403, filed on Mar. 4, 2008.

(30) Foreign Application Priority Data

Mar. 26, 2007    (CN) ................. 2007 1 0088095

(51) Int. Cl.
- H04L 12/66 (2006.01)
- H04J 3/00 (2006.01)
- H04M 3/42 (2006.01)
- G06F 15/16 (2006.01)

(52) U.S. Cl.
USPC .......... 370/271; 370/328; 370/353; 379/201; 379/270; 709/225; 709/229

(58) Field of Classification Search
USPC .......... 370/271–328, 352–389; 455/435–445; 709/223–229, 238–246
See application file for complete search history.

(56) References Cited

U.S. PATENT DOCUMENTS

| | | | |
|---|---|---|---|
| 7,496,089 B2* | 2/2009 | Hiroshima et al. | 370/353 |
| 7,570,756 B2* | 8/2009 | Park et al. | 379/270 |
| 7,773,983 B2* | 8/2010 | Takeda | 455/420 |
| 8,111,614 B2* | 2/2012 | Feuer et al. | 370/220 |
| 8,112,523 B2* | 2/2012 | Van Elburg et al. | |
| 2008/0014939 A1* | 1/2008 | Chang | 455/435.2 |

(Continued)

FOREIGN PATENT DOCUMENTS

| | | |
|---|---|---|
| A1 | 2006/102339 A2 | 9/2006 |
| CN | 1635765 A | 7/2005 |

(Continued)

OTHER PUBLICATIONS

"3rd Generation Partnership Project; Technical Specification Group Services and System Aspects; Identification of Communication Services in IMS (Release 7)" Generation Partnership Project (3GPP), Mar. 2006.

(Continued)

*Primary Examiner* — Man Phan
(74) *Attorney, Agent, or Firm* — Brinks Hofer Gilson & Lione

(57) ABSTRACT

A system, device and method for implementing a special call service are disclosed. The method includes receiving a session establishment request message carrying a service type identifier, determining a service type identified by the service type identifier in the session establishment request message, and implementing a special call service with a service processing logic corresponding to the service type.

13 Claims, 9 Drawing Sheets

U.S. PATENT DOCUMENTS

| | | | |
|---|---|---|---|
| 2008/0039104 A1* | 2/2008 | Gu et al. ........................ | 455/445 |
| 2008/0113679 A1* | 5/2008 | Sung et al. ..................... | 455/466 |
| 2008/0132161 A1* | 6/2008 | Chen et al. .................... | 455/3.05 |
| 2009/0193131 A1* | 7/2009 | Shi ................................ | 709/229 |
| 2010/0091706 A1* | 4/2010 | Noldus et al. ................. | 370/328 |

FOREIGN PATENT DOCUMENTS

| | | |
|---|---|---|
| CN | 1700176 | 11/2005 |
| CN | 1700716 A | 11/2005 |
| CN | 1863209 A | 11/2006 |
| CN | 1997069 A | 7/2007 |
| CN | 101022483 A | 8/2007 |
| CN | 101022483 B | 4/2011 |

OTHER PUBLICATIONS

"3$^{rd}$ Generation Partnership Project; Technical Specification Group Services and System Aspects; Identification of Communication Services in IMS; Stage 2 (Release 7)" Generation Partnership Project (3GPP), Mar. 2007.

Lindblad, Ingemar et al. Ericsson's IMS Solution for Enterprise—The Vehicle for Collaboration. Ericsson Review. Jan. 1, 2005:100-109.

Loretto S. et al. Input 3$^{rd}$ Generation Partnership Project (3GPP) Communications Service Identifiers Requirements on the Session Initiation Protocol (SIP); IETF Standard-Working-Draft, Internet Engineering Task Force. Jun. 16, 2006.

Tsang, Simon, et al. "SIP Extensions for Communicating with Networked Appliances; draft-tsang-sip-appliances-do-00.txt" Internet Engineering Task Force. Nov. 1, 2000.

Rosenberg, J. et al. "Best Current Practices for Third Party Call Control (3pcc) in the Session Initiation Protocol (SIP)" The Internet Society. Apr. 2004.

Handley, M. "RFC 2543—SIP: Session Initiation Protocol" The Internet Society. 1999.

Rosenberg, et al. "RFC 3261—SIP: Session Initiation Protocol" The Internet Society. 2002.

Office Action issued in corresponding Chinese Patent Application No. 2007100880957; issued Jul. 17, 2009.

Written Opinion of the International Searching Authority issued in corresponding PCT Application No. PCT/CN2008/070403; mailed Jun. 12, 2008.

Extended European Search Report issued in corresponding European Patent Application No. 08 715 139.5; issued Jun. 25, 2010.

Office Action (with partial translation) issued in corresponding Chinese Patent Application No. 200710088095.7, mailed Aug. 5, 2010.

International Search Report issued in corresponding PCT Application No. PCT/CN2008/070403; mailed Jun. 12, 2008.

Office Action issued in corresponding European Patent Application No. 08715139.5, mailed Jan. 31, 2011.

Summons to Attend Oral Proceedings issued in corresponding European Patent Application No. 08715139.5, mailed Jan. 17, 2013.

* cited by examiner

SYSTEM, DEVICE AND METHOD FOR IMPLEMENTING SPECIAL CALL SERVICE

This application claims priority to Chinese Patent Application No. 200710088095.7, entitled "System, device and method for implementing special call service" and filed with the Chinese Patent Office on Mar. 26, 2007, which is hereby incorporated by reference in its entirety.

FIELD OF THE DISCLOSURE

The present invention relates to communication technologies and in particular to a system and method for implementing a special call service, a special call service initiating entity and a special call service processing device.

Background With respect to communication technologies, there are special communication systems, such as a dispatch communication system and a contact center system, in addition to general communication systems. The special communication systems provide special call services such as call intrusion service, break-down service, group call service, a monitor service, emergency broadcasting service and call grade service, in addition to the general telephone call service. In the call intrusion service, a user of a high grade may forcibly "intrude" into an ongoing conversation of a user of a low grade. The break-down service is to disconnect two parties in an ongoing conversation to communicate with one of the two parties while deactivating the other. In the group call service, a user of a high grade may call a group of users simultaneously to hold an instant telephone conference. In the emergency broadcasting service, a dispatch station may send an emergency broadcasting notification to a specific group of users in case of an emergency, and telephones of the group of users may answer automatically (without operation by a user) and be kept in a hands-free status for listening. These special call services serve routine operation and management in an enterprise or organization.

Currently, most of the existing special communication systems are based upon digital program-controlled telephone switching technologies with Time Division Multiplexing (TDM) timeslot switching. No special communication system based upon other signaling control protocols, such as the Session Initiation Protocol (SIP), the H.323 protocol, the Media Gateway Control Protocol (MGCP) or the Q.931 protocol, which are based upon the Internet Protocol (IP), has been introduced.

In the TDM timeslot switching technologies, voice sent from a calling user is sampled and subjected to an analog-to-digital conversion to be converted into a binary code stream of a certain length, which is sent to a switching network chip; the switching network chip switches the binary code stream from the calling side to a line at the called side; and the stream is subjected to digital-to-analog conversion at the called side and is then played by a telephone at the called side.

A dispatch communication system based upon TDM timeslot switching includes four components: a dispatch communication switch, a management station, a dispatch station and a subscriber station. Hereinafter, the components of the dispatch communication system based upon TDM timeslot switching will be described.

The dispatch communication switch, which may be connected to other communication systems, is adapted to switch voice from the user and implement various special call services. Typically, the dispatch communication switch is a hardware system based upon a large scale integrated circuit, a very large scale integrated circuit or a Printed Circuit Board (PCB) loaded with control software, and is relatively expensive.

The management station, which may be a commercial workstation or a server, is adapted to configure and manage the dispatch communication switch.

The dispatch station is adapted to send a dispatch message to the subscriber station through the dispatch communication switch to call the subscriber station. The dispatch station may be a customized telephone with a plurality of buttons, or a software operated on a computer (or workstation) typically connected to a microphone and a speaker.

The subscriber station, which may be a common telephone, is adapted to receive the dispatch message sent by the dispatch station through the dispatch communication switch.

The above-described dispatch communication system based upon TDM timeslot switching may ideally implement a voice service. However, the format and standard of a data packet for communication used in this dispatch communication system is different from those of a data packet in the Internet. As a result, it is difficult to integrate this dispatch communication system with other systems (for example, an industry automatic control system, an information system, etc., in an enterprise or organization). Therefore, there is a need for a novel special call service system which is easily integrated with other systems and improves the operation efficiency of the entire enterprise or organization.

SUMMARY OF THE INVENTION

A system, device and method for implementing a special call service, which comply with an Internet Protocol based signaling control protocol to be easily integrated with other information systems, are provided.

A system for implementing a special call service is provided, including a special call service initiating entity adapted to send a session establishment request message carrying a service type identifier identifying a service type of a special call service, where the session establishment request message complies with an Internet Protocol based signaling control protocol; and a special call service processing device adapted to receive the session establishment request message carrying the service type identifier, and implement the special call service with a service processing logic corresponding to the service type identified by the service type identifier.

A further device for processing a special call service is provided, and the device includes: a receiving unit adapted to receive a session establishment request message carrying a service type identifier from a sending unit; a determining unit adapted to determine a service type identified by the service type identifier in the session establishment request message received by the receiving unit; a storage unit adapted to store service processing logic information including the service type and a service processing logic corresponding to the service type; and a processing unit adapted to implement a special call service in accordance with the service type determined by the determining unit and the service processing logic information stored in the storage unit.

A further special call service initiating entity is provided, including a setting unit adapted to set, in a session establishment request message, a service type identifier identifying a service type of a special call service, where the session establishment request message complies with an Internet Protocol based signaling control protocol; and a sending unit adapted to send to a special call service processing device the session establishment request message including the service type identifier, which is set by the setting unit.

A further method for implementing a special call service is provided, including receiving a session establishment request message complying with an Internet Protocol based signaling control protocol, with a service type identifier being carried in the session establishment request message; determining a service type identified by the service type identifier in the session establishment request message; and implementing a special call service with a service processing logic corresponding to the service type.

A special call service is implemented with an IP based signaling control protocol. Presently, most information systems in enterprises are based on IP. Therefore, the system for implementing a special call service according to the present disclosure may be easily integrated with most information systems, so that the method and system for implementing a special call service according to the present disclosure may be easily integrated with other information systems in an enterprise or organization. Thus a special call service may be triggered according to information from the other information systems, thereby making more efficient use of the information from the other information systems and improving the operation efficiency of the enterprise.

DETAILED DESCRIPTION OF THE DISCLOSURE

The embodiments of the disclosure will be described in detail below.

The First Embodiment

A system for implementing a special call service, which complies with an IP based signaling control protocol (for example, the SIP protocol, the H.323 protocol, the MGCP protocol or the Q.931 protocol), is provided. The system will be described below in connection with the SIP protocol as an example.

Figure 1:
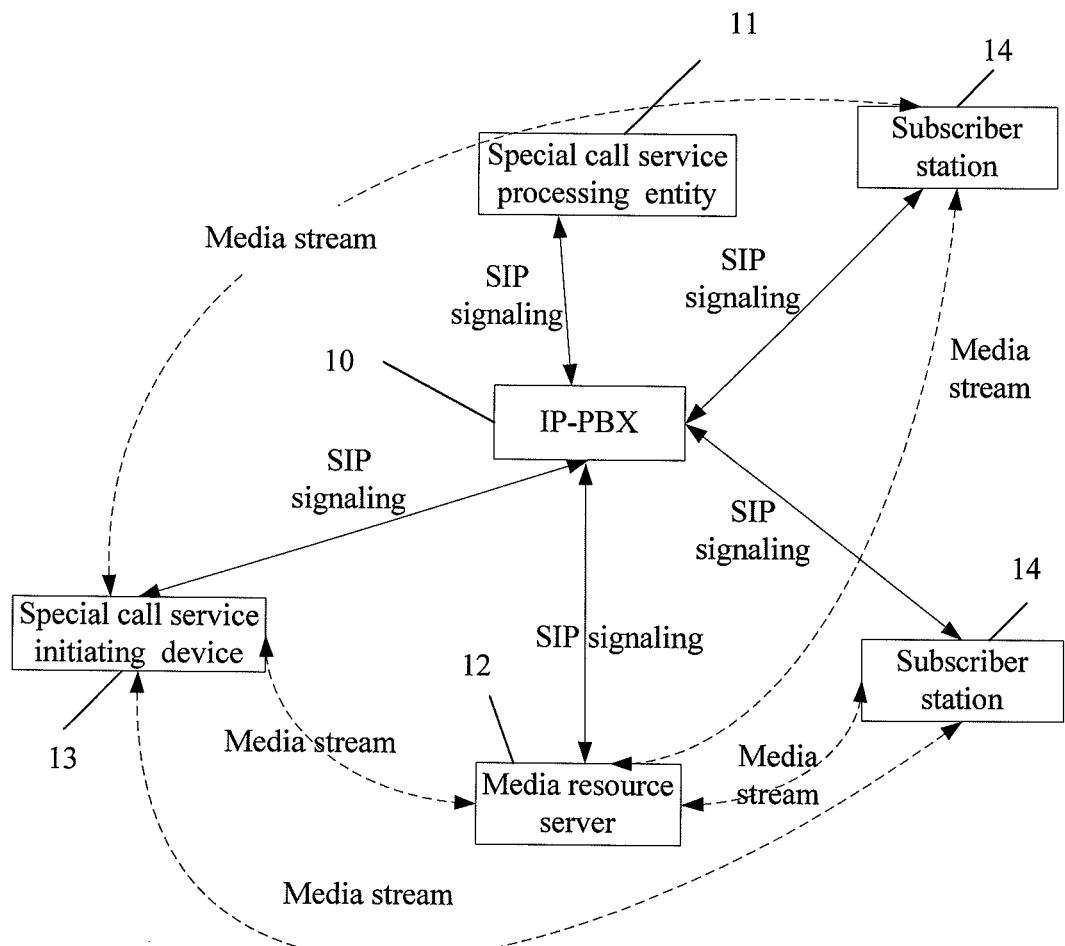
FIG. 1 illustrates a networking diagram of a system for implementing a special call service according to a first embodiment of the disclosure.

As illustrated in FIG. 1, the system for implementing a special call service includes an Internet Protocol Private Branch exchange (IP-PBX) 10, a special call service processing device 11, a media resource server 12, a management station (not shown), a special call service initiating entity 13 and a subscriber station 14.

The IP-PBX 10 is adapted for user registration, receiving a session establishment request message from the special call service initiating entity, distributing the session establishment request message and routing a call. The IP-PBX 10 may be a commercial server or a communication device in the form of a PCB. The session establishment request message carries a service type identifier for identifying a call intrusion service, a break-down service, or a group call service, etc.

The special call service processing device 11 is adapted to receive the session establishment request message forwarded by the IP-PBX 10, and implement a special call service by means of the IP-PBX 10 and the media resource server 12 in accordance with the service type identifier in the session establishment request message. The special call service processing device 11 also defines a service processing logic corresponding to the service type. The special call service processing device 11 may be an Application Server (AS) compatible with the SIP protocol. Furthermore, the special call service processing device 11 may be integrated together with the IP-PBX 10, the Application Server or a special terminal (a dispatch station, an operator console, a customized terminal, etc.), or be deployed on an additional server or PCB.

The Media Resource Server 12 is adapted to combine voice and/or video data from a plurality of subscriber stations and the special call service initiating entity and send the combined voice and/or video data to the subscriber stations and/or the special call service initiating entity or record audio and/or video under the control of the special call service processing device 11. The media resource server 12 may be a PCB based on Digital Signal Processor (DSP) or a CPU on which certain software is run. The media resource server 12 is not required for all of the special call services. For example, the media resource server is necessary for the implementation of the call intrusion service and the group call service and may be used for the implementation of the break-down service and the monitor service, but is not necessary for the implementation of the emergency broadcasting service and the call grade service.

The management station, which may be a commercial computer or workstation, is adapted to configure and manage the dispatch communication system.

The special call service initiating entity 13 includes a setting unit and a sending unit. The setting unit sets the service type identifier for identifying the service type of the special call service in the session establishment request message which is based upon the SIP protocol, the H.323 protocol, the MGCP protocol or the Q.931 protocol. The sending unit sends the session establishment request message including the service type identifier to the special call service processing device 11 through the IP-PBX 10. The special call service initiating entity 13 may be a customized SIP telephone, a special call service initiating entity in the form of software running on a computer or workstation (which is configured with a microphone and a speaker), a dispatch station, an operator console, a call center agent, a customized terminal, an Application Server, an IP PBX or the like.

The subscriber station 14, which is a user terminal to be dispatched, may be a common SIP telephone or a traditional analog telephone connected to the IP-PBX 10 via an Access Gate (AG).

Figure 2:
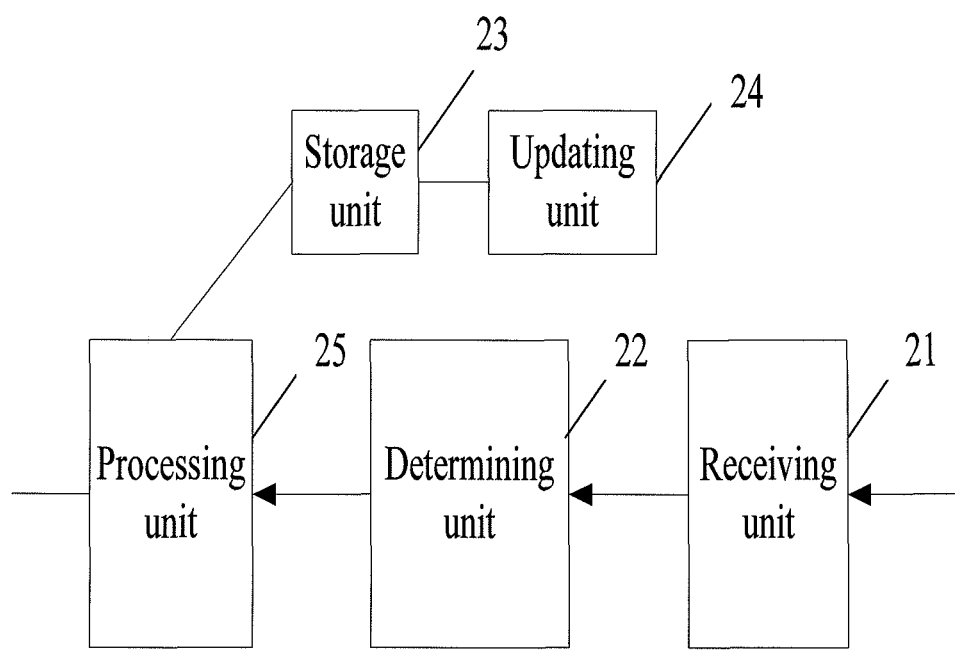
FIG. 2 illustrates a schematic diagram of a device for processing a special call service according to the first embodiment of the disclosure.

As illustrated in FIG. 2, the special call service processing device includes:

a receiving unit 21 adapted to receive the session establishment request message carrying the service type identifier;

a determining unit 22 adapted to determine the service type identified by the service type identifier in the session establishment request message;

a storage unit 23 adapted to store service processing logic information including the service type and the service processing logic corresponding to the service type;

an updating unit 24 adapted to update the service processing logic information stored in the storage unit 23, and the updating of the service processing logic information stored in the storage unit includes adding of newly defined service processing logic information to the storage unit 23 and/or modifying of the existing service processing logic information in the storage unit 23; and a processing unit 25 adapted to implement the special call service in accordance with the service type determined by the determining unit 22 and the service processing logic information stored in the storage unit 23.

In the above system, it shall be noted that the special call service processing device 11, the media resource server 12, the special call service initiating entity 13 and the subscriber station 14 may be connected directly for communication without the IP-PBX 10. Furthermore, in the transmission of the session establishment request message, an intermediate entity which can not identify the special service identifier may transmit the session establishment request message transparently.

The Second Embodiment

A method for implementing a special call service (for example, the call intrusion service, the break-down service or the group call service) using a media resource server is provided, and this method includes: receiving a session establishment request message carrying a service type identifier; determining a service type identified by the service type identifier in the session establishment request message; and implementing the special call service using a media resource server in accordance with the determined service type.

Particularly, in combination with the system of the first embodiment, the special call service may be initiated by the special call service initiating entity, in other words, the special call service initiating entity sends the session establishment request message carrying the service type identifier to the special call service processing device through the IP-PBX, and the service may be a call intrusion service, a break-down service, a group call service, etc. Upon receiving the session establishment request message from the special call service initiating entity, the special call service processing device triggers the special call service in accordance with the service type identifier carried in the session establishment request message. For the SIP protocol, the session establishment request message may be an extended INVITE message or a user-defined message. In the method for implementing a special call service, the media resource server may be used to provide a voice mixer and/or a video mixer. The INVITE message may be extended in the following or other similar ways.

1) A new attribute type, for example, is added in the header field To of the INVITE message to identify the service type of the special call service.

2) A new header field Type, for example, is added in the INVITE message to identify the service type of the special call service.

3) A new attribute is added in an SIP message body (a Session Description Protocol (SDP) message) to identify the service type of the special call service.

A method for sending a session establishment request message will be described below by way of an example in which a header field is added in the INVITE message.

For example, a session establishment request message may be sent via an extended INVITE message to implement the call intrusion service. In other words, a service type identifier is added in the INVITE message and is set as Call Intrusion service. In a specific extension, a parameter is added in the header field To indicate that the call type is a Call Intrusion service.

For example, a session establishment request message to implement the call intrusion service is as follows.
INVITE sip:50719@10.166.50.51 SIP/2.0
From: <sip:50718@10.166.50.51>;tag=1c27997
To: <sip:50719@10.166.50.51>;type=Call Intrusion
Call-Id: s__2402__4a4e2603e89f . . .

Similarly, a session establishment request message may be sent via an extended INVITE message to implement the break-down service. In other words, a service type identifier is added in the INVITE message and is set as Break-down service. In a specific extension, a parameter is added in the header field To indicate that the call type is a Break-down service.

For example, a session establishment request message to implement the break-down service is as follows.
INVITE sip:50719@10.166.50.51 SIP/2.0
From: <sip:50718@10.166.50.51>;tag=1c27997
To: <sip:50719@10.166.50.51>;type=Break-down
Call-Id: s__2402__4a4e2603e89f . . .

Similarly, a session establishment request message may be sent via an extended INVITE message to implement the group call service. In other words, a service type identifier is added in the INVITE message and is set as Group Call service, and a Uniform Resource Identifier (URI) of the opposite end is set as the ID of the group. In a specific extension, a parameter is added in the header field To indicate that the call type is Group Call service.

For example, a session establishment request message to implement the group call service is as follows.
INVITE sip:#001#@10.166.50.51 SIP/2.0
From: <sip:50718@10.166.50.51>;tag=1c27997
To: <sip:#001#@10.166.50.51>;type=Group Call
Call-Id: s__2402__4a4e2603e89f . . .

The above methods for extending a session establishment request message are also applicable to the H.323 protocol, the MGCP protocol or the Q.931 protocol. For example, an attribute may be added in the SETUP message of the H.323 protocol to identify the service type of a special call service; an attribute may be added in the CRCX message of the MGCP protocol to identify the service type of a special call service; and an attribute may be added in the SETUP message of the Q.931 protocol to identify the service type of a special call service.

Upon receiving the session establishment request message, the special call service processing device implements the logic corresponding to the service type in accordance with the service type identifier in the session establishment request message. Hereinafter, the method for implementing a special call service will be described with respect to various service types.

Figure 3:
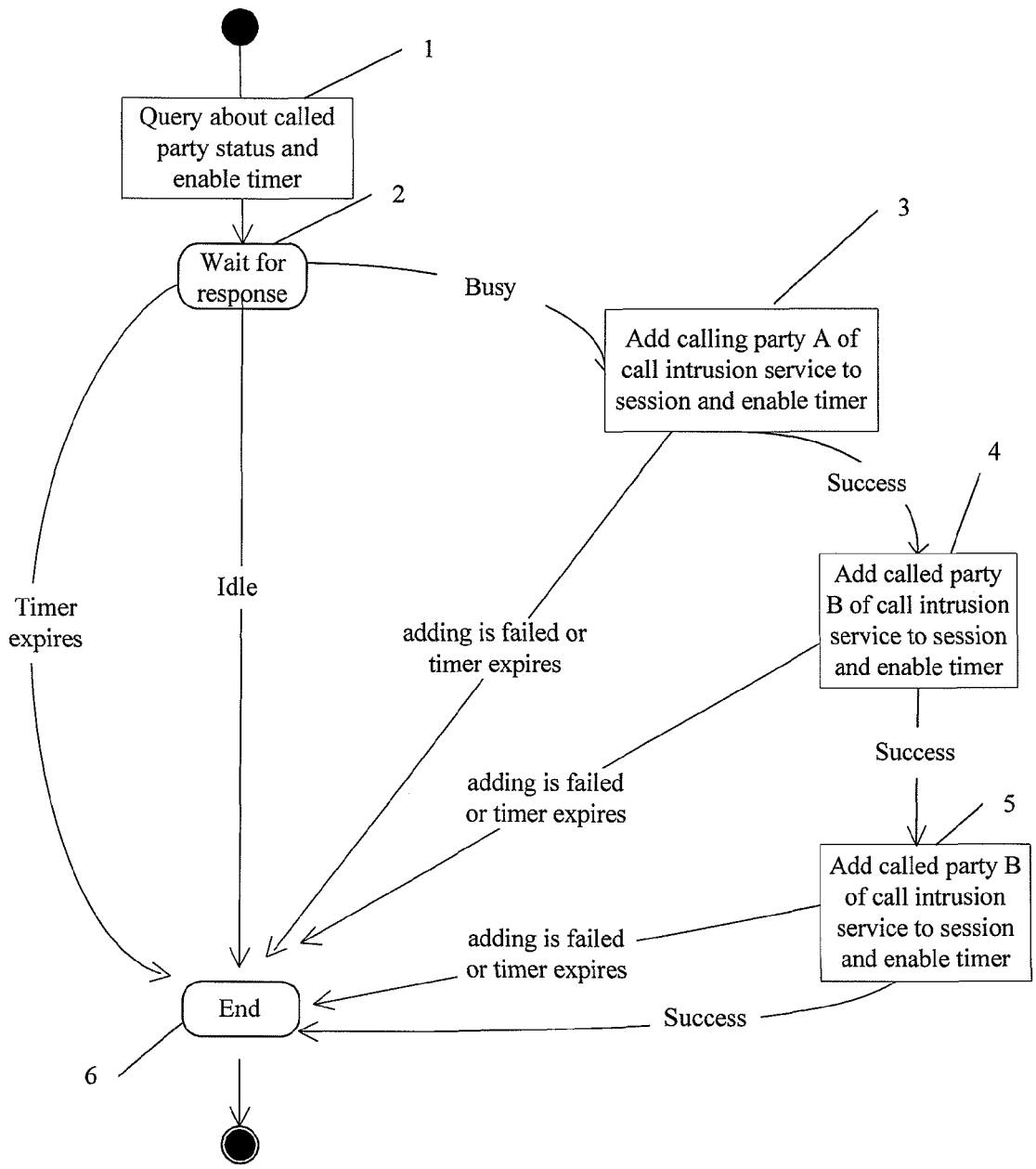
FIG. 3 illustrates a flow chart of the method for implementing a call intrusion service according to a second embodiment of the disclosure.

As shown in FIG. 3, a flow of the method for implementing a call intrusion service is illustrated. It is assumed that a calling party of the call intrusion service is indicated by A, and called parties of call intrusion are indicated by B and C. A may correspond to the special call service initiating entity (for example, a dispatch station below), and B and C may correspond to the special call service initiating entity or the subscriber station.

Step 1 queries for a session status of the called party of the call intrusion service, enables a timer and then waits for a response.

Step 2 waits for a response.

If the response awaited is "Timer-expired", the flow proceeds to step 6.

If the response awaited is "Idle", the called party is putted through directly and the flow proceeds to step 6.

If the response awaited is "Busy", the flow proceeds to step 3.

Step 3 adds the calling party A of the call intrusion service to a session, enables a timer and then waits for a response.

If the adding of the calling party A to the session fails or the timer expires, the flow proceeds to step 6.

If the adding of the calling party A to the session succeeds, the flow proceeds to step 4.

Step 4 adds the called party B of the call intrusion service to the session, enables a timer and then waits for a response.

If the adding of the called party B to the session fails or the timer expires, the flow proceeds to step 6.

If the adding of the called party B to the session succeeds, the flow proceeds to step 5.

Step 5 adds the called party C of the call intrusion service to the session, enables a timer and then waits for a response.

If the adding of the called party C to the session fails or the timer expires, the flow proceeds to step 6.

If the adding of the called party C to the session succeeds, the flow returns a success message and then proceeds to step 6.

In step 6, the flow ends.

In the above steps of the call intrusion service, the procedures of adding the calling party of the call intrusion service to a session and transferring the called party of the call intrusion service to the session may be implemented in the following flows.

Figure 4:
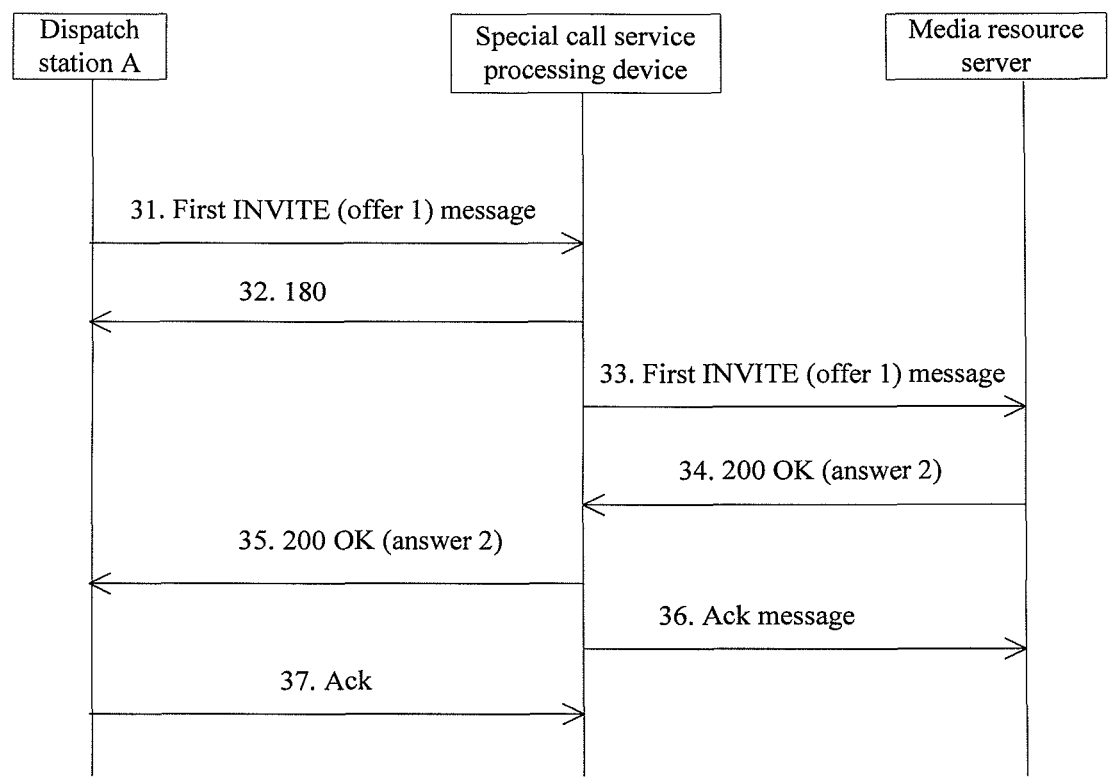
FIG. 4 illustrates a flow chart of adding a calling party of the call intrusion service into a session according to the second embodiment of the disclosure.

As shown in FIG. 4, the flow of adding the calling party of the call intrusion service to the session includes the following steps.

In step 31, the dispatch station A sends to the special call service processing device a first INVITE (offer 1) message containing SDP information of the dispatch station A, and the SDP information includes an IP address of the dispatch station A and information on the supported codec.

In step 32, the special call service processing device returns to the dispatch station A a 180 message (i.e., a ring response to be returned to the dispatch station A).

In step 33, the special call service processing device sends to the media resource server a first INVITE (offer 1) message containing the IP address of the dispatch station A and the information on the supported codec.

In step 34, upon receiving the INVITE (offer 1) message, the media resource server returns to the special call service processing device a 200 OK (answer 2) response message including SDP information of the media resource server, i.e., the IP address of the media resource server and information on supported codec.

In step 35, the special call service processing device sends the 200 OK message carrying the SDP information of the media resource server to the dispatch station A.

In step 36, the special call service processing device sends an ACK message to the media resource server.

In step 37, the dispatch station A sends an ACK message to the special call service processing device.

With the above flow, the dispatch station A obtains the SDP information of the media resource server and the media resource server obtains the SDP information of the dispatch station A. Thus, the media resource server may add the dispatch station A to a session, so that the dispatch station A may communicate with other dispatch station of the session.

Figure 5:
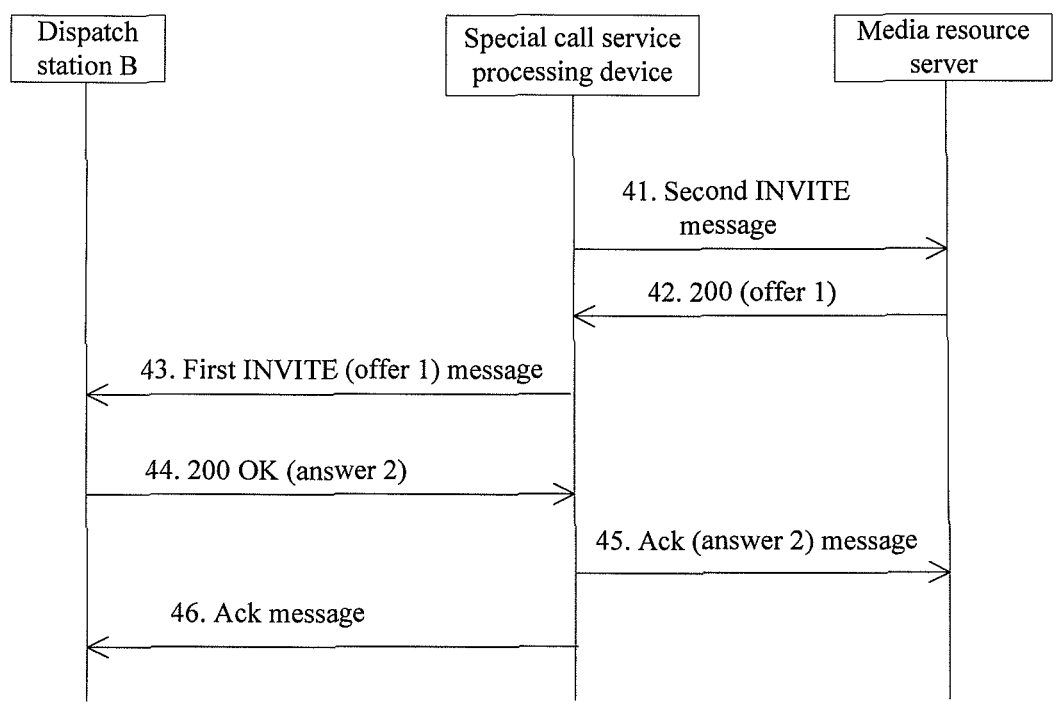
FIG. 5 illustrates a flow chart of adding a called party of the call intrusion service into the session according to the second embodiment of the disclosure.

As shown in FIG. 5, the flow of transferring the called party of the call intrusion service to the session includes the following steps.

In step 41, the special call service processing device sends to the media resource server a second INVITE message carrying no SDP information of the special call service processing device.

In step 42, upon receiving the INVITE message, the media resource server sends to the special call service processing device a 200 response message carrying the SDP information of the media resource server.

In step 43, the special call service processing device sends a first INVITE (offer 1) message to the subscriber station B, to send the SDP information of the media resource server to the subscriber station B. The INVITE (offer 1) message is an INVITE message sent by the special call service processing device for the second time, and therefore is referred to as a Re-INVITE message.

In step 44, the subscriber station B sends to the special call service processing device a 200 OK message carrying SDP information of the subscriber station B.

In step 45, the special call service processing device sends an ACK response message carrying the SDP information of the subscriber station B upon obtaining the SDP information of the subscriber station B.

In step 46, the special call service processing device sends an ACK message to the subscriber station B.

After the above steps, the subscriber station B obtains the SDP information of the media resource server and the media resource server obtains the SDP information of the subscriber station B. Thus, the subscriber station B is transferred from an original communication to the session of the media resource server.

The flow of adding one of the users (the subscriber station B) of the call intrusion service to the session is described in steps 41 to 46. Another user of the call intrusion service (the subscriber station C) may also be added to the session in the same flow.

Figure 6:
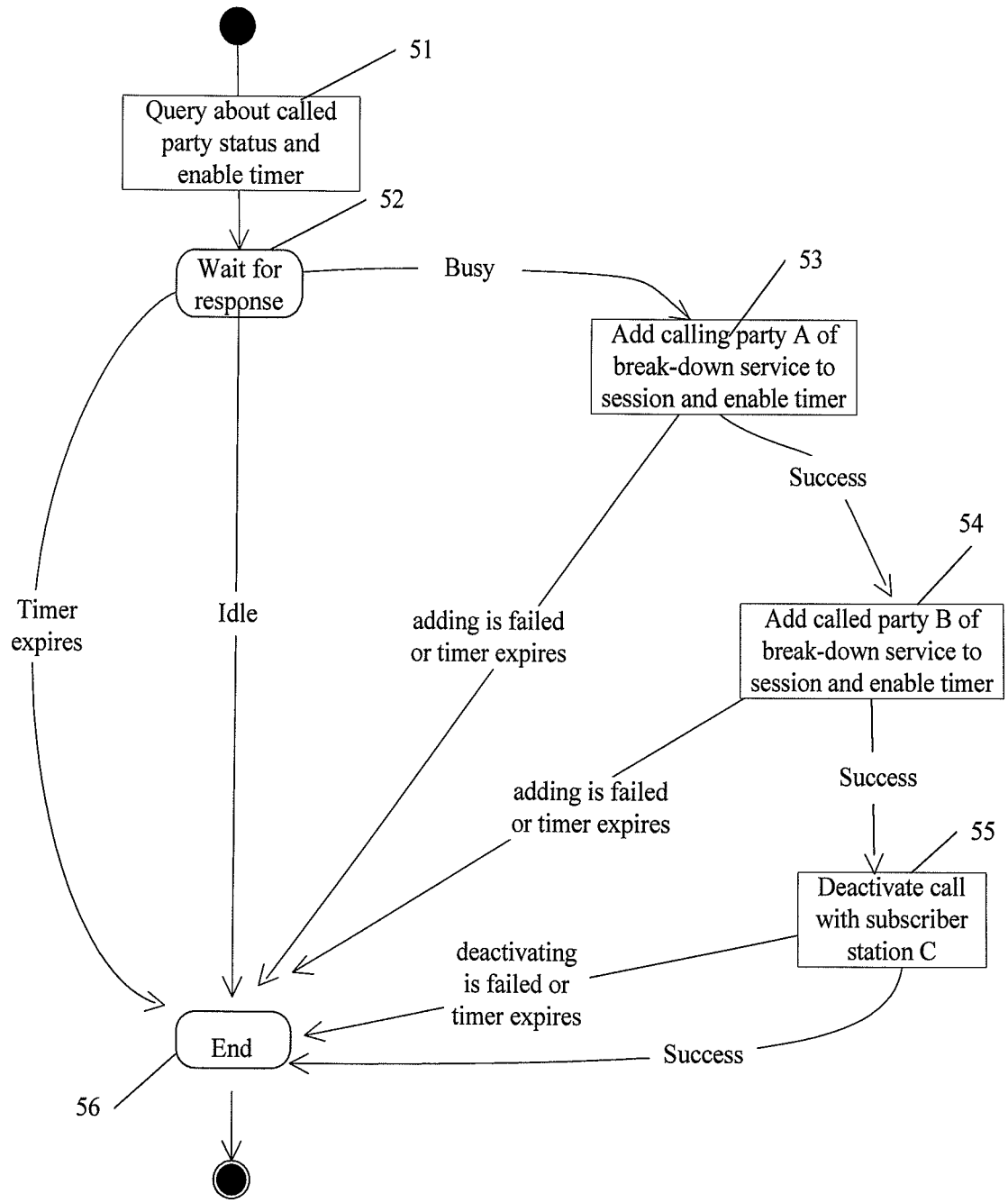
FIG. 6 illustrates a flow chart of the method for implementing a break-down service according to the second embodiment of the disclosure.

As shown in FIG. 6, a flow of the method for implementing a break-down service is illustrated. It is assumed that a calling party of the break-down service is indicated by A, and called parties of the break-down service are indicated by B and C. A may correspond to the special call service initiating entity (for example, a dispatch station below), and B and C may correspond to the special call service initiating entity or the subscriber station.

Step 51 queries for a session status of the called party of a break-down service, enables a timer and then waits for a response.

Step 52 waits for a response.

If the response awaited is "Timer-expired", the flow proceeds to step 56.

If the response awaited is "Idle", the flow proceeds to step 56.

If the response awaited is "Busy", the flow proceeds to step 53.

Step 53 adds the calling party A of the break-down service to a session, enables a timer and then waits for a response.

If the adding of the calling party A to the session fails or the timer expires, the flow proceeds to step 56.

If the adding of the calling party A to the session succeeds, the flow proceeds to step 54.

Step 54 adds the called party B of the break-down service to the session, enables a timer and then waits for a response.

If the adding of the called party B to the session fails or the timer expires, the flow proceeds to step 56.

If the adding of the called party B to the session succeeds, the flow proceeds to step 55.

Step 55 deactivates the called party C of the break-down service. In other words, step 55 simply sends a Bye message to the called party C, and waits for a response.

If the deactivating of the called party C fails or the timer expires, the flow proceeds to step 56.

If the deactivating of the called party C succeeds, the flow ends up with returning a success message.

In step 56, the flow is ended.

Figure 7:
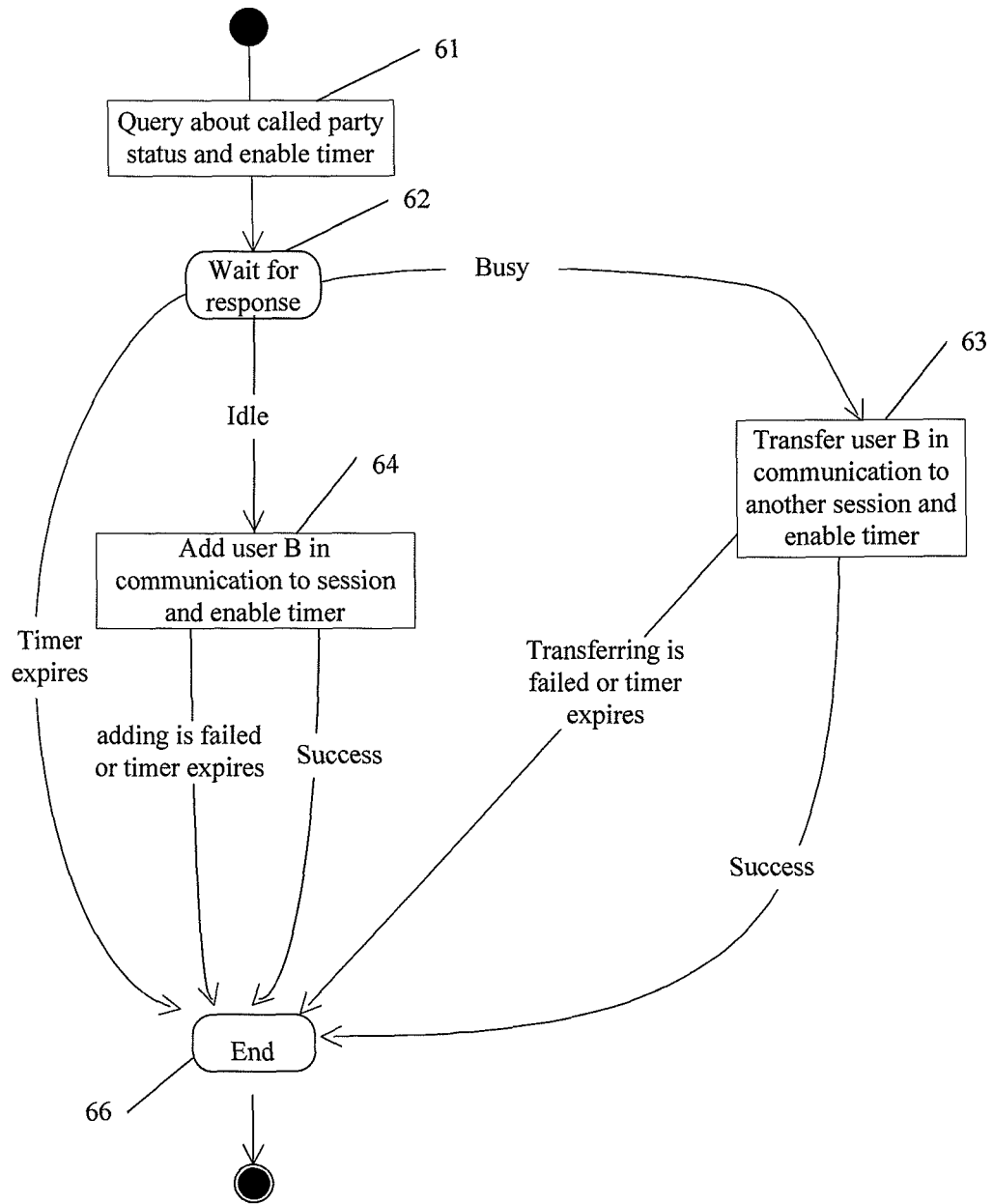
FIG. 7 illustrates a flow chart of the method for implementing a group call service according to the second embodiment of the disclosure.

The method for implementing the group call service includes the following steps. As illustrated in FIG. 7, the method for implementing the group call service will be described below. It is assumed that a calling party of a group call service is indicated by A, and a called party of the group call service is indicated by B; and A may correspond to the special call service initiating entity (for example, a dispatch station below), and B may correspond to the special call service initiating entity or the subscriber station.

Step 61 queries for a session status of the called party of the group call service, enables a timer and then waits for a response.

Step 62 waits for a response.

If the response awaited is "Timer-expired", the flow proceeds to step 66.

If the response awaited is "Idle", the flow proceeds to step 64.

If the response awaited is "Busy", the flow proceeds to step 63.

Step 63 transfers the called party B of the group call service to another session, enables a timer and then waits for a response.

If the transferring of the called party B to another session fails or the timer expires, error handling is carried out and the flow proceeds to step 66.

If the transferring of the called party B to another session succeeds, the flow proceeds to step 66.

Step 64 adds the called party B of the group call service to a session, enables a timer and then waits for a response.

If the adding of the called party B to the session fails or the timer expires, error handling is carried out and the flow proceeds to step 66.

If the adding of the called party B to the session succeeds, the flow proceeds to step 66.

In step 66, the flow ends.

The above steps of implementing the group call service include the flow of adding the called party of a group call service to a session.

Figure 8:
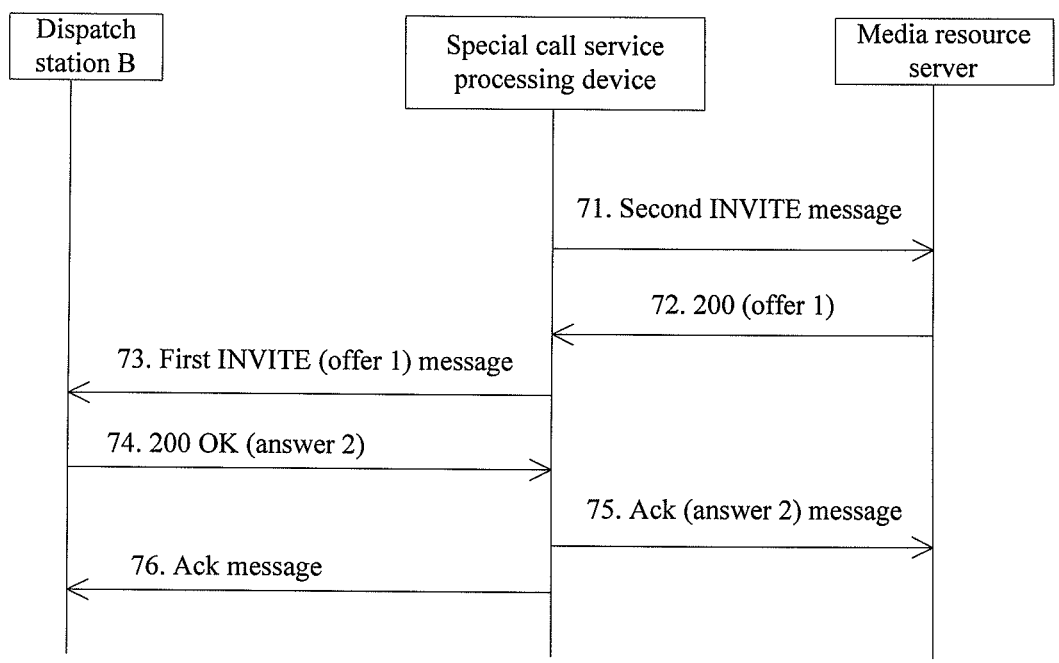
FIG. 8 illustrates a flow chart of adding a called party of the group call service into a session according to the second embodiment of the disclosure.

The flow of adding the called party (i.e., the subscriber station B) of a group call service to the session is as illustrated in FIG. 8 and includes the following steps.

In step 71, the special call service processing device sends to the media resource server a second INVITE message carrying no SDP information of the special call service processing device.

In step 72, upon receiving the second INVITE message, the media resource server sends to the special call service processing device a 200 response message carrying the SDP information of the media resource server.

In step 73, the special call service processing device sends a first INVITE (offer 1) message to the subscriber station B, to send the SDP information of the media resource server to the subscriber station B.

In step 74, the subscriber station B sends to the special call service processing device a 200 OK message carrying the SDP information of the subscriber station B.

In step 75, the special call service processing device sends an ACK response message carrying the SDP information of the subscriber station B upon obtaining the SDP information of the subscriber station.

In step 76, the special call service processing device sends an ACK message to the subscriber station B.

With the above steps, the subscriber station B obtains the SDP information of the media resource server and the media resource server obtains the SDP information of the subscriber station B. Thus, the subscriber station B is redirected from an original communication to the session of the media resource server.

The Third Embodiment

This embodiment discloses a method for implementing a special call service (for example, the emergency broadcasting service) without a media resource server. The method includes receiving a session establishment request message carrying a service type identifier, determining a service type identified by the service type identifier in the session establishment request message, and implementing a special call service in accordance with the determined service type.

Figure 9:
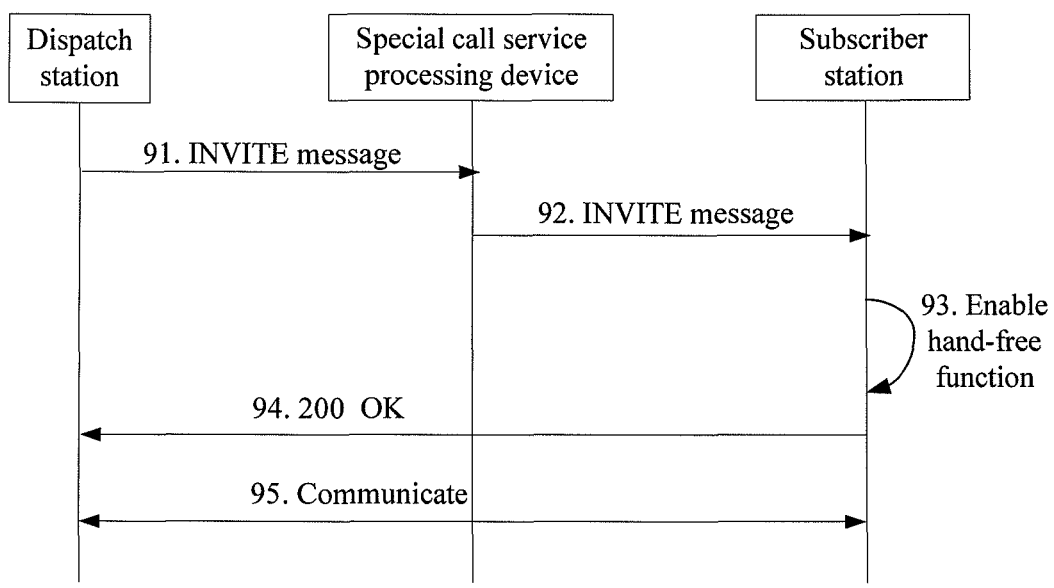
FIG. 9 illustrates a flow chart of the method for implementing an emergency broadcasting service according to a third embodiment of the disclosure.

In combination with the system of the first embodiment, particularly, the emergency broadcasting service may be initiated by the special call service initiating entity (for example, a dispatch station). In other words, the special call service initiating entity sends the session establishment request message carrying the service type identifier to the special call service processing device through the IP-PBX, and the service type identifier may indicate an emergency broadcasting service. Upon receiving the session establishment request message from the dispatch station, the special call service processing device triggers the emergency broadcasting service in accordance with the emergency broadcasting identifier carried in the session establishment request message. For the SIP protocol, the session establishment request message may be an extended INVITE message or a user-defined message. The second embodiment can be made reference to for the way of extending the INVITE message. The implementation of the emergency broadcasting service will be described below with reference to FIG. 9 with respect to an INVITE message as an example.

In step 91, upon an emergency, a management staff sends an INVITE message carrying the emergency broadcasting service identifier to the special call service processing device through an IP-PBX.

In step 92, upon receiving the INVITE message, the special call service processing device perceives that the service type identifier indicates the emergency broadcasting service, obtains subscriber station numbers of this call according to the processing logic of the emergency broadcasting service and sends the INVITE message carrying the emergency broadcasting service identifier to all subscriber stations through the IP-PBX.

In step 93, the subscriber stations enable a hands-free function upon receiving the INVITE message carrying the emergency broadcasting service identifier.

In step 94, the subscriber stations returns a 200 OK response message to the dispatch station.

In step 95, thus the emergency broadcasting service is established successfully between the dispatch station and the plurality of subscriber stations, and the dispatch station may send voice to the subscriber stations.

The second and third embodiments have described some special call services, i.e., the call intrusion service, the breakdown service, the group call service and the emergency broadcasting service. Other special call types (for example, the monitor service, the call grade service, etc.) may also be implemented in a method similar to the above methods and therefore descriptions thereof will be omitted herein.

In the system and method for implementing a special call service according to the embodiments of the invention, the structure of a session establishment request message is extended simply, to satisfy the demand of the special call service (such as the monitor service) on a communication protocol. Particularly, according to the embodiments of the invention, only the session establishment request of an IP based signaling control protocol (for example, the SIP protocol, the H.323 protocol, the MGCP protocol or the Q.931 protocol) is extended in terms of the message structure. Because the IP based signaling control protocol is an IP based protocol and fully compatible with the communication protocol, the system and method according to the embodiments of the disclosure may be interfaced well with other communication entities in a communication system and easily be integrated with other systems, thereby improving the operation efficiency in an enterprise. Furthermore, the less extension allows for a low development cost for the communication device manufacturer possessing an IP based signaling control protocol stack.

Furthermore, the special call service initiating entity may be a console in an automatic control system. Thus a service type of a session establishment request message may also be a failure identifier of the automatic control system. The failure identifier of the automatic control system includes an identifier and a failure number of the automatic control system. When an exception occurs to the automatic control system, a session establishment request message carrying the failure identifier of the automatic control system is sent to the special call service processing device by the automatic control system. And upon receiving the session establishment request message in which identifier indicates the service type of the automatic control system, the special call service processing device may handle the failure (for example, by initiating a call) in accordance with the service type of the automatic control system and a predetermined rule, thereby facilitating the management of the enterprise.

To summarize, the system for implementing a special call service according to the embodiment of the disclosure may be integrated easily together with an automatic control system to improve the management efficiency of an enterprise.

In a communication system with its core being protocols such as H.323, MGCP or Q.931, the IP based signaling control protocol may also be extended in a way similar to that in the embodiment of the disclosure, so as to support a special call service such as the monitor service with a relatively low design and development costs.

Those ordinarily skilled in the art shall appreciate that various modifications and variations may be made to the disclosure without departing from the spirit of the invention, and therefore the scope of the invention shall be defined in the appended claims.

The invention claimed is:

1. A system for implementing a special call service, comprising:

a special call service initiating entity, adapted to set a service type identifier identifying a service type of the special call service in a session establishment request message, and send the session establishment request message to a special call service processing device; and the special call service processing device, adapted to receive the session establishment request message; and implement the special call service according to the service type identified by the service type identifier;

wherein the service type identifier identifies a group call service, and wherein the special call service processing device is adapted to:

query a communication status of a called party;

when the communication status of the called party is "Busy", transfer the called party to a group call session through a media resource server; or when the communication status of the called party is "Idle", add the called party to a group call session through a media resource server;

wherein the special call service processing device further comprises:

a determining unit adapted to determine the service type identified by the service type identifier in the session establishment request message;

a storage unit adapted to store service processing logic information comprising the service type and a service processing logic corresponding to the service type; and wherein the special call service processing device is adapted to implement the special call service in accordance with the service type determined by the determining unit and the service processing logic information stored in the storage unit.

2. The system for implementing a special call service according to claim 1, further comprising:

the media resource server adapted to provide a media stream for the special call service under control of the special call service processing device.

3. A device for processing a special call service, comprising:

a receiving unit adapted to receive a session establishment request message carrying a service type identifier from a special call service initiating entity;

a determining unit adapted to determine a service type identified by the session establishment request message in accordance with the service type identifier;

a storage unit adapted to store service processing logic information comprising the service type and a service processing logic corresponding to the service type; and a processing unit adapted to implement the special call service in accordance with the service type determined by the determining unit and the service processing logic information stored in the storage unit;

wherein the service type identifier identifies a group call service, and wherein the processing unit is adapted to:

query a communication status of a called party;

when the communication status of the called party is "Busy", transfer the called party to a group call session through a media resource server; or when the communication status of the called party is "Idle", add the called party to a group call session through a media resource server.

4. The device for processing a special call service according to claim 3, further comprising an updating unit adapted to update the service processing logic information stored in the storage unit.

5. A method for implementing a special call service, comprising:
  receiving a session establishment request message carrying a service type identifier from a special call service initiating entity;
  determining a service type identified by the service type identifier in the session establishment request message;
  storing service processing logic information comprising the service type and a service processing logic corresponding to the service type; and
  implementing the special call service in accordance with the service type identified by the service type identifier and stored service processing logic information, wherein the service processing logic information comprises the service type and a service processing logic corresponding to the service type,
  wherein the service type identifier identifies a group call service, and
  wherein implementing the special call service comprising:
    querying a communication status of a called party;
    when the communication status of the called party is "Busy", transferring the called party to a group call session through a media resource server; or
    when the communication status of the called party is "Idle", adding the called party to a group call session through a media resource server.

6. The method for implementing a special call service according to claim 5,
  wherein the service type identifier further identifies a failure of an automatic control system, and
  wherein the implementing the special call service further comprises: handling the failure according to an identifier of the automatic control system and a predetermined rule.

7. The method for implementing a special call service according to claim 5,
  wherein the service type identifier identifies a call intrusion service, and
  wherein the implementing the special call service further comprises:
    querying a communication status of a called party; and
    when the communication status of the called party is "Busy", adding a calling party of the call intrusion service to a session and transferring the called party of the call intrusion service to the session through a media resource server.

8. The method for implementing a special call service according to claim 7, wherein the adding of the calling party of the call intrusion service to the session comprising:
  sending to the media resource server an INVITE message carrying Session Description Information of the calling party;
  receiving a response message carrying Session Description Information of the media resource server; and
  sending to the calling party the response message carrying the Session Description Information of the media resource server.

9. The method for implementing a special call service according to claim 7, wherein the transferring of the called party of the call intrusion service to the session comprising:
  sending an INVITE message to the media resource server;
  receiving a response message carrying Session Description Information of the media resource server from the media resource server;
  sending to the called party an INVITE message carrying the Session Description Information of the media resource server;
  receiving a response message carrying Session Description Information of the called party; and
  sending to the media resource server the response message carrying the Session Description Information of the called party.

10. The method for implementing a special call service according to claim 5,
  wherein the service type identifier further identifies a break-down service, and
  wherein the implementing the special call service further comprising:
    querying a communication status of called parties; and
    when the communication status of the called parties is "Busy", adding a calling party and one of the called parties to a session and deactivating the other of called parties through a media resource server.

11. The method for implementing a special call service according to claim 5, wherein the transferring of the called party to the group call session through the media resource server comprising:
  sending an INVITE message to the media resource server;
  receiving a response message which carries Session Description Information of the media resource server from the media resource server;
  sending an INVITE message carrying the Session Description Information of the media resource server to the called party;
  receiving a response message carrying Session Description Information of the called party; and
  sending to the media resource server the response message carrying the Session Description Information of the called party.

12. The method for implementing a special call service according to claim 5, wherein the session establishment request message is an INVITE message based on a Session Initiation Protocol or a user-defined message.

13. The method for implementing a special call service according to claim 12, wherein:
  the service type of the special call service is identified with a header field of the INVITE message;
  the service type of the special call service is identified with an attribute in the INVITE message; or
  the service type of the special call service is identified with an attribute in a Session Description Protocol message body of the INVITE message.

* * * * *